United States Patent [19]

Nishida

[11] Patent Number: 4,950,116

[45] Date of Patent: Aug. 21, 1990

[54] MANIPULATOR CONTROLLING APPARATUS

[75] Inventor: Shinichiro Nishida, Funabashi, Japan

[73] Assignee: Kabushiki Kaisha Toshiba, Kawasaki, Japan

[21] Appl. No.: 395,721

[22] Filed: Aug. 18, 1989

[30] Foreign Application Priority Data

Aug. 18, 1988 [JP] Japan .................................. 63-203738
Apr. 28, 1989 [JP] Japan .................................... 1-107562

[51] Int. Cl.⁵ ................................................ B25J 3/04
[52] U.S. Cl. ........................................... 414/5; 901/8; 901/9
[58] Field of Search .................... 414/5, 909; 901/8, 9; 244/234, 236, 237

[56] References Cited

U.S. PATENT DOCUMENTS

| 3,578,270 | 5/1971 | Ellis | 244/236 |
| 4,150,803 | 4/1979 | Fernandez | 244/135 A |
| 4,640,663 | 2/1987 | Niinomi et al. | 901/8 X |
| 4,661,032 | 4/1987 | Arai | 414/5 |

FOREIGN PATENT DOCUMENTS

| 737917 | 11/1978 | U.S.S.R. | 901/9 |
| 883863 | 3/1980 | U.S.S.R. | 901/9 |
| 798713 | 1/1981 | U.S.S.R. | 901/9 |
| 1061987 | 10/1982 | U.S.S.R. | 901/9 |

Primary Examiner—Robert J. Spar
Assistant Examiner—William M. Hienz
Attorney, Agent, or Firm—Cushman, Darby & Cushman

[57] ABSTRACT

Apparatus for controlling a manipulator employs a control device, first to third detectors, a producing device and a driving device. The first detector detects an operating force/torque generated by the control device and the second detector detects a deflecting amount of the control device from a reference position. The third detector detects an end force applied on an end portion of the manipulator and reaction signals are generated by the producing device. The reaction signal corresponds to a function of the deflecting amount and the end force. A force/torque corresponding to the difference between output signals from the first detector and the producing device are generated by the driving device and applied on the control device.

14 Claims, 5 Drawing Sheets

MANIPULATOR CONTROLLING APPARATUS

BACKGROUND OF THE INVENTION

1. Field of the Invention

This invention relates to a manipulator including a slave arm, and, more specifically, to an apparatus for controlling a manipulator incorporated into an artificial satellite, a crane etc.

2. Description of the Related Art

It is now contemplated to construct a space station in outer space and to conduct various experiments there. In space construction, desirable to be able as well as in other types of construction, it is to manipulate tools, materials, etc. remotely. For this purpose there is employed a remotely controlled manipulator.

The manipulator is controlled by an operation of a handling means, which includes a driving mechanism having six degrees of freedom defined by three shafts substantially orthogonal to one another and three rotation shafts also substantially orthogonal to one another as shown in U.S. patent application No. 07/323,754, filed by the inventor of this application and others on Mar. 15, 1989.

When an operator operates a control device, such as a joystick, an operating force corresponding to an amount of the movement of the control device, is generated by an elastic body, such as a spring, connected to the control means and is transferred to the operator through the control device. At the same time, a deflecting amount of the control device is detected by a detector and a command signal corresponding to the detector and a command signal corresponding to the deflecting amount is generated to supply to a driving device of the manipulator. Thus, the manipulator can be operated in correspondence to the movement of the control device by the operator.

In the manipulator as mentioned above, however, it is difficult for the operator to operate the manipulator in response to a force applied on an end portion of the manipulator precisely and subtly because the operator cannot feel the applied force exactly. Therefore, it is possible to break an object by an excessive force applied on the end portion of the manipulator. Thus, special handling technique is required in the operation of the manipulator.

SUMMARY OF THE INVENTION

It is an object of the present invention to provide a manipulator controlling apparatus which allows an operator to precisely feel a force applied on an end of the manipulator.

It is a further object of the present invention to operate the manipulator precisely and subtly.

It is still a further object of the invention to operate the manipulator by easy handling technique.

To achieve the above objects and in accordance with the purpose of the invention, as embodied and broadly described herein, the invention provides apparatus for controlling a manipulator in response to an external force.

Control means generates an operating force/torque corresponding to the external force. The operating force/torque are detected by first detecting means and a deflecting amount corresponding to the movement of the control means from a reference position is detected by second detecting means.

A manipulator is driven in response to the movement of the control means and end force applied on an end portion of the manipulator are detected by third detecting means. Reaction signals corresponding to a function of the deflecting amount and the end force are generated and driving signals corresponding to the difference between output signals from the first detecting means and the producing means are generated. Force/torque corresponding to the driving signals are applied on the control means.

BRIEF DESCRIPTION OF THE DRAWINGS

Presently preferred embodiments of the present invention will be described in detail with reference to the accompanying drawings in which.

DETAILED DESCRIPTION OF THE PREFERRED EMBODIMENTS

Figure 1:
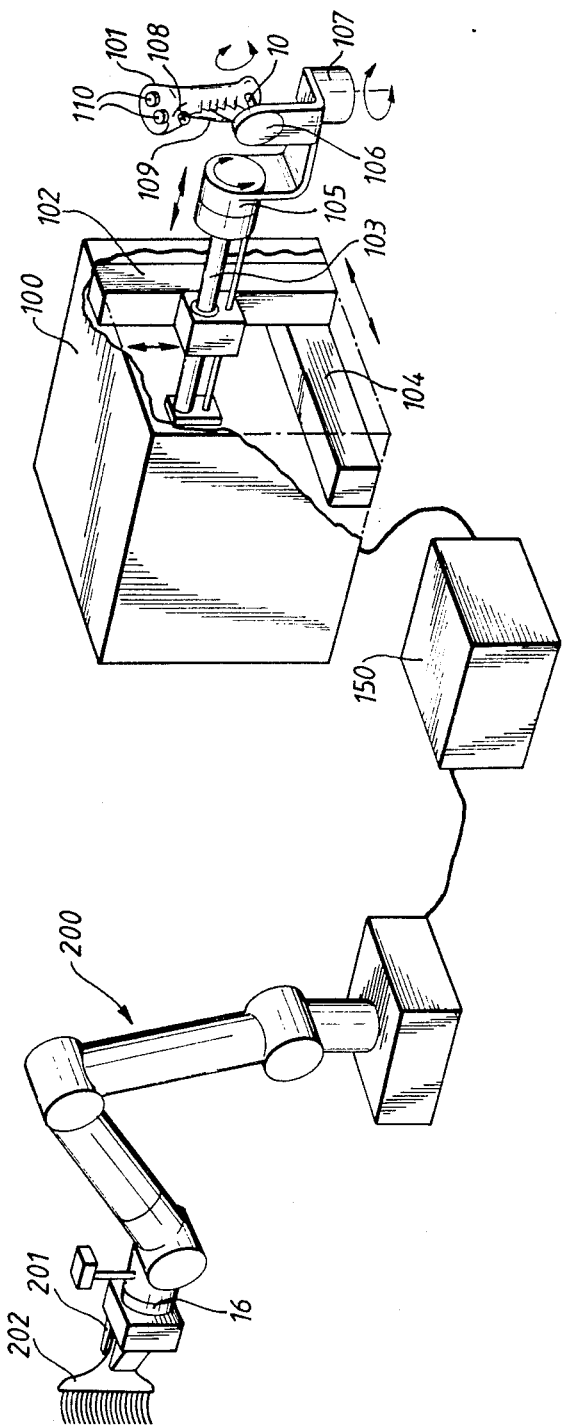
FIG. 1 is a perspective view of a manipulator controlling apparatus according to one embodiment of this invention.

Referring to the accompanying drawings, an embodiment of the present invention will be described. However, in the drawings, the same numerals are applied to the similar elements in the drawings, and therefore the detailed description thereof is not repeated.

Figure 2:
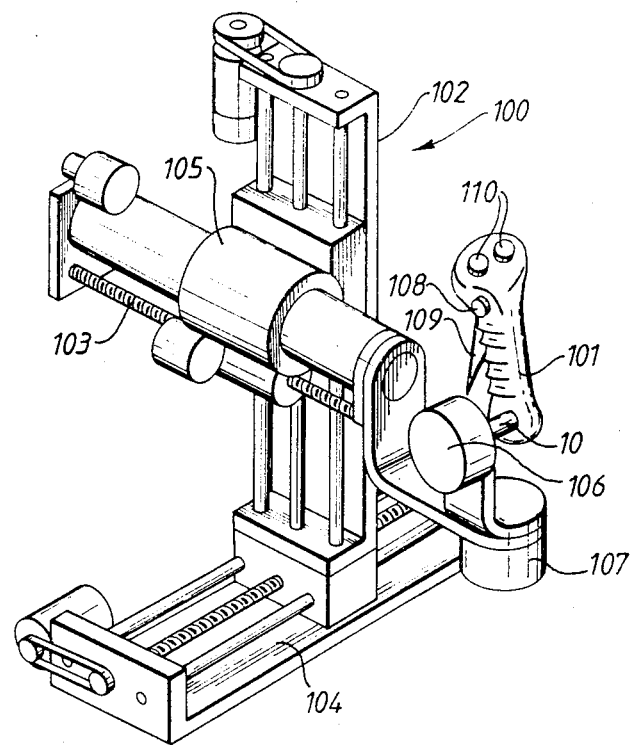
FIG. 2 is a perspective view illustrating an operation unit shown in FIG.

As shown in FIG. 1, a manipulator controlling apparatus includes a rectangular coordinate type operation unit 100, a controlling device 150 and a manipulator 200. As shown in FIG. 2, this unit 100 includes an operation handle 101 operated by an operator. The handle 101 is provided in such a manner that the handle 101 may be freely subjected to translation along three translation shafts substantially orthogonal to one another through a first translation mechanism 102, a second translation mechanism 103 and a third translation mechanism 104 and may be freely rotated around substantially orthogonal rotation shafts through rotation mechanism 105, 106 and 107. The driving of the manipulator 200 is controlled, by the controlling device 150, interlockingly with the operation of the handle 101. The handle 101 includes a mode change switch 108, an operation lever 109 for controlling the operation of a holding section 201 of the manipulator 200, and range change switches 110. When operated, the mode change switch 108 selectively sets the controlling device 150 in one of first, second and third control modes. The first mode, called a speed command control mode, is for controlling the manipulator 200 so that it is driven at a speed corresponding to the operation force applied to the handle 101. The second mode, called a position command control mode (bilateral master-slave control), is for controlling the manipulator 200 that it is driven at a speed corresponding to the difference between target feedback force for an operator operating the handle 101 and force generated by the operation unit 100. The third control mode is for driving the three translation shafts in the second control mode and driving the three rotation shafts in the first control mode.

The operation level 109, when operated, drives the holding section 201 of the manipulator 200 to hold or release a work tool 202. The range change switches 110, when operated, change the working range of the manipulator 200. The operation unit 100 also includes a force/torque sensor 10 which detects a force applied on the three translation shafts and a torque applied on the three rotation shafts upon operation of the handle 101 and supplies output signals to the controlling device 150.

Figure 3:
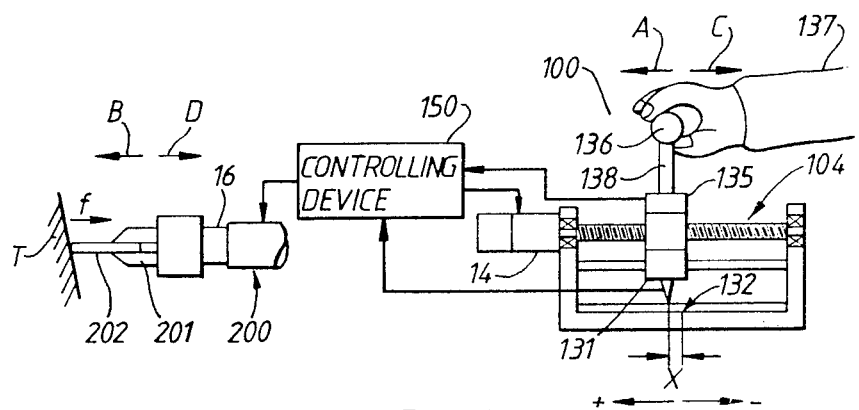
FIG. 3 is a diagram explaining the operation of the present apparatus.

FIG. 3 is a diagram explaining the operation of the apparatus shown in FIG. 1. It is simplified by showing only one translation mechanism 104. The operation unit 100 includes a deflecting sensor 131 having a neutral position 132 which is a middle position of the translation mechanism 104. The unit 100 also includes a force/torque sensor 135 which is connected to a handle axis 138 to detect a operating force/torque applied on a handle 136 by an operator 137. The deflecting sensor 131 may detect a deflecting amount x corresponding to the movement of the handle axis 138 from the neutral position 132. Output signals from the sensors 131, 135 are supplied to the controlling device 150. An end force sensor 16 is equipped in the manipulator 200 to detect end force f applied on an end portion of the manipulator 200 through the tool 202 and the holding section 201. Output signal of the sensor 16 is also supplied to the controlling device 150. A driving mechanism 14 is provided with a driving signal from the controlling device 150 to apply force to the translation mechanism 104.

Figure 4:
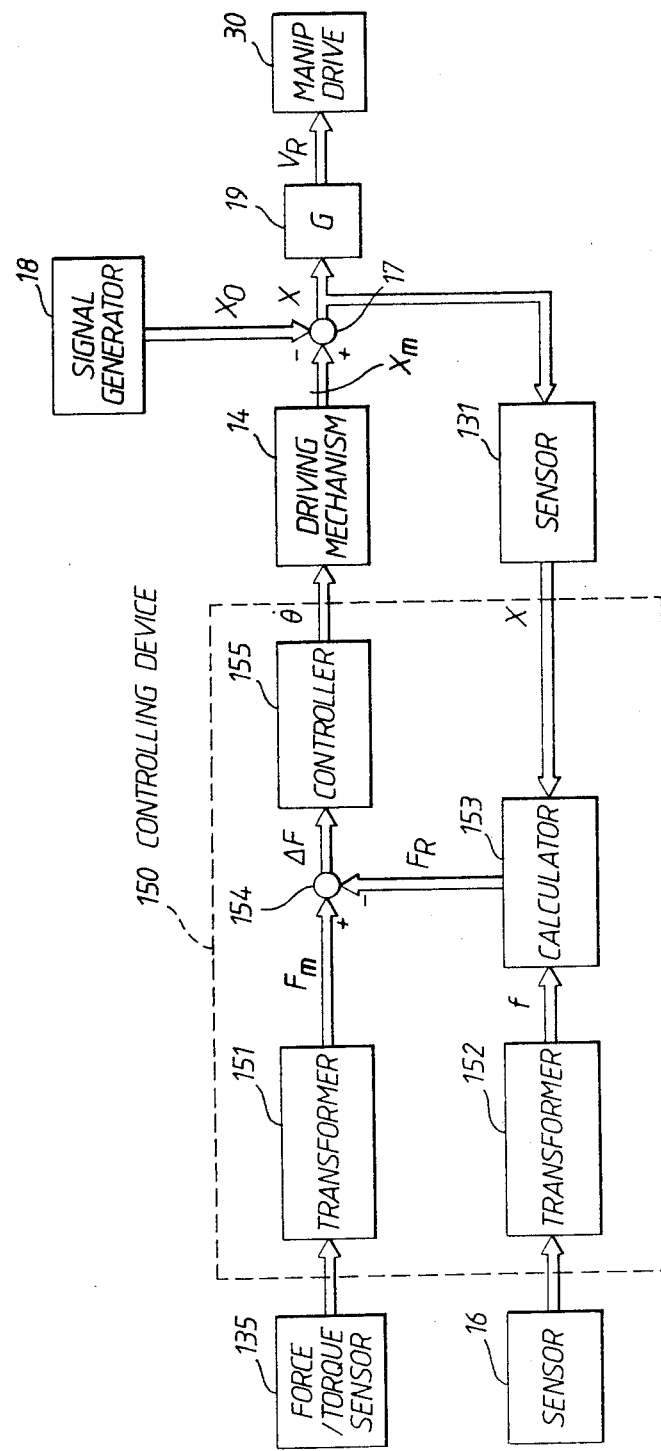
FIG. 4 is a block diagram of a control system of the present apparatus.

The controlling device 150 includes coordinates transformers 151 and 152, a calculator 153, a subtractor 154 and a controller 155 as shown in FIG. 4. The attitude of the sensor 135 may be variable because of the connection to a base of the handle axis 138 Thus, as to output information of the sensor 135, a transformation of the coordinates is executed in the transformer 151 in order to obtain the force/torque $F_m$, in predetermined coordinates, applied on the handle 136. Also, because the attitude of the end portion of the manipulator 200 may be variable, a transformation of the coordinates is executed in the transformer 152 as to output information of the sensor 16. The calculator 153 includes a processor which is provided with output signals from the sensor 131 and the transformer 152 to calculate an elastical reaction force $F_R$, from the end force f and the deflecting amount X. For example, the force $F_R$ is represented by equations, as to one degree of freedom, as follows, $$F_R = 0 (-a < x < a), \quad (1)$$

$$F_R = K_a X - a/K_a (x \geq a); \quad (2)$$

$$F_R = K_b X + a/K_b (x \leq -a); \quad (3)$$

In these equations, $K_a$ and $K_b$ are assumed moduli of elasticity and are expressed by function of the force f as follows,
if $f \pm 0$ $$K_a = C|f| + o \, C_o. \quad (4)$$

and
$$K_b = C_o, \quad (5)$$
if $f < 0$, $$K_a = C_o \quad (6)$$

and
$$K_b = C|f| + C_o. \quad (7)$$

In these expressions. C and Co are positive constants. The calculator 153 produces reaction signals corresponding to reaction force $F_R$ which may be represented by a function of the deflecting amount X and the end force f as mentioned above.

Figure 5:
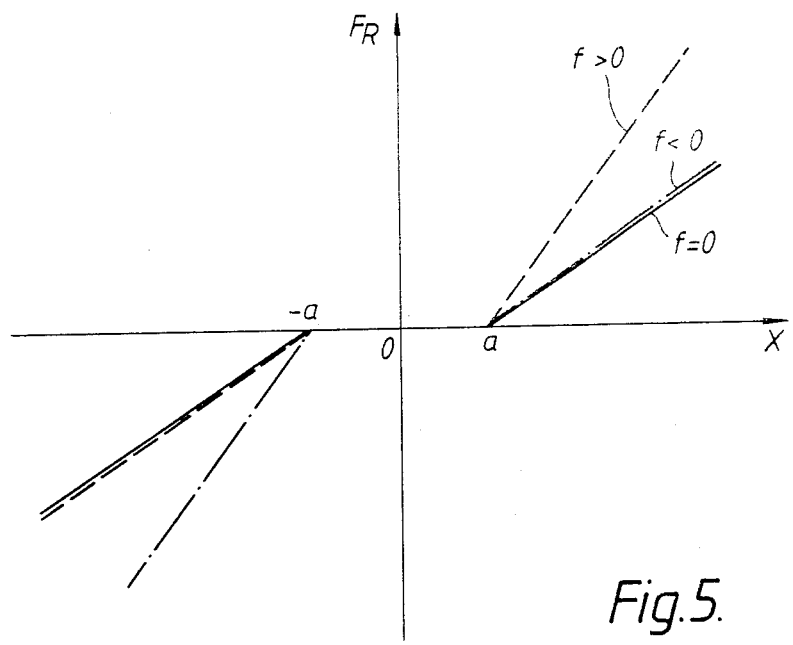
FIG. 5 is a graph showing the characteristics of the calculator shown in FIG. 4.

FIG. 5 is a graph of characteristics of the reaction force $F_R$ in expressions (1)~(7). When the force f equals to zero (f=0), the reaction force $F_R$, corresponds to continuous lines and has approximately symmetrical characteristics to a reference position X0. When the force f is greater than zero (f>0), the reaction force $F_R$ corresponds to dashed lines. And when the force f is less than zero (f<0), the reaction force $F_R$ corresponds to chain lines.

Figure 6:
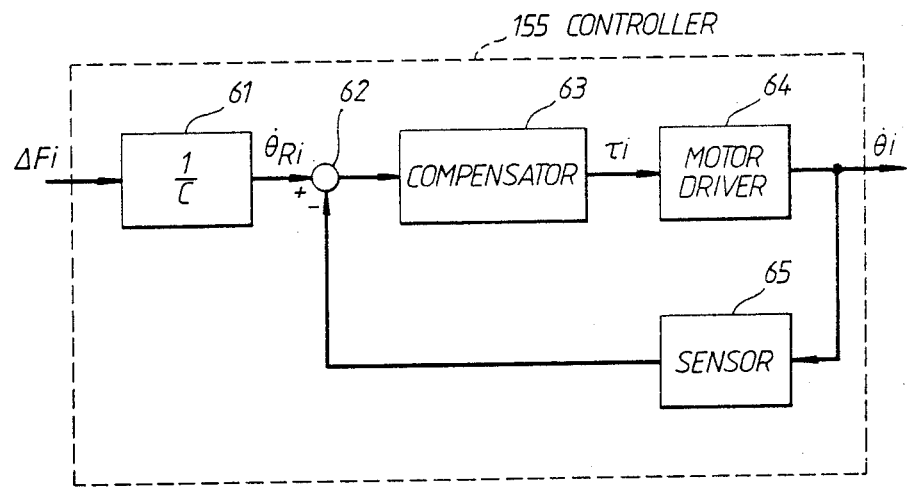
FIG. 6 is a block diagram of the controller shown in FIG. 4.

The calculator 153 calculates the reaction force $F_R$ by expressions (1)~(7) and also calculates force/torque corresponding to another five degrees of freedom in the same manner as mentioned above. Output signals corresponding to the reaction force/torque $F_R$ are supplied to the subtractor 154 to detect the difference $\Delta F$ between the force/torque $F_m$ applied on the handle 101 and the reaction force/torque $F_R$. Output signals from the subtractor 154 are supplied to the controller 155 to generate force/torque for controlling the driving mechanism 14 as to six degrees of freedom. A operating deflection $X_m$ of the mechanism is detected in each degree of freedom by a sensor (not shown) and supplied to a substractor 17. The subtractor 17 is provided with signals corresponding to a reference position X0, such as a neutral position, from a signal generator 18 and obtain the deflecting amount $X (= X_m - X_0)$. A multiplier 19 generates speed command signals $V_R$ to control a manipulator driver 30 for driving the manipulator 200 by the multiplication of the amount X and a proportional coefficient G. The amount X is also detected by the sensor 131. FIG. 6 shows a block diagram of the controller 155 with a speed control. A multiplier 61 is provided with the difference $\Delta F_i$ which is multiplied with coefficient 1/C to obtain speed signals $\dot{\theta}R_i (= \Delta F_i / c)$ (i=1, 2, . . . ,6). The coefficient 1/C corresponds to a coefficient of viscosity of an elastic body and may be set variably when the handle axis are considered to be supported by an elastic mechanism. A compensator 63 is equipped for stabilization of the control as an integral compensator and generates desired torque $\tau_i$. A motor driver 64 drives the driving mechanism 14 of the operation unit 100 at motor speed $\dot{\theta}_i$. A sensor 65 detects rotational velocity of the motor included in the motor driver 64 to return the detected signal to the subtractor 62. The subtractor 62 detects the difference between output signals from the multiplier 61 and the sensor 65 to supply to the compensator 63.

An operation of the present apparatus will be explained for comprehension of the invention subsequently. In FIG. 3, when the operator 137 applies the operating force on the handle 136 to a direction shown by an arrow A, a position of the handle axis 138 may be changed by X from the neutral position 132 The end portion of the manipulator 200 moves to a direction shown by an arrow B in response to a command signal, such as a positive speed command signal, corresponding to the shifting the handle axis 138. Reaching a obstacle T, the manipulator 200 still continues to move in the same direction if the operator 137 maintains the position of the handle axis 138 by an application of the operating force to the handle 136. Then, the obstacle T applies an end force f(f>0) on the end portion of the manipulator 200 through the tool 202. The force f is detected by the sensor 16 of the manipulator 200 and the detected signals corresponding to the force f are supplied to the calculator 153 after the coordinate transformation in the transformer 152. The calculator 153 is also provided with the detected signals corresponding to the deflecting amount X of the handle axis 138 from the sensor 131. When the amount X is greater than a (shown in FIG. 5) and the force f is greater than zero, the calculator 153 calculates the reaction force $F_R$ by the equations (2) and (4). In this case, the greater the force f becomes, the greater the assumed moduli of elasticity Ka, corresponding to the gradient of the cashed line ($x \geq a$) shown in FIG. 5, becomes. When the amount X is less than a, the amount X is in a neutral zone and the force $F_R$ is not calculated by the calculator 153 regardless of a value of the force f. Output signals corresponding to the force $F_R$ from the calculator 153 are supplied to the subtractor 154 to detect the difference signal corresponding to the difference of between the operating force $F_m$ and the reaction force $F_R$ ($F = F_m - F_R$). Therefore, the controller 155 generates less power due to $F < F_m$ and drives the driving mechanism 14 of the operating unit 100.

In the operation, when the end portion of the manipulation 200 pushes the obstacle T, the operator 137 is able to feel the force f applied on the end portion of the manipulator 200 because the handle 136 becomes hard to move. This condition corresponds to changing of the assumed modulus of elasticity of the handle 136. As shown in expressions (2) and (4), the modulus of elasticity Ka may be variable in correspondence to a value of the force f. Accordingly, the operator 137 is able to find subtle force applied on the end portion of the manipulator 200 in terms of the changing of the assumed modulus of elasticity of the handle 136.

When the operator 137 pulls the handle 136 to a direction shown by an arrow C in FIG. 3 and the handle axis 138 exceeds the neutral point 132, the amount X becomes negative ($X \leq -a$) and negative speed command signals are supplied to the manipulator driver. Then the end portion of the manipulator 200 may be moved to a direction shown by an arrow D. In this case, the assumed modulus of elasticity Kb may be constant as shown in expression (5) due to the fact that the end portion of the manipulator 200 separates from the obstacle T and does not receive the end force f any more.

When f<0, the explanation above may be effective if the sign of the amount X is inverted.

As shown in expressions (2)~(7), the assumed modulus of elasticity Ka or Kb is set as different value corresponding to the sign of the force f.

Figure 7:
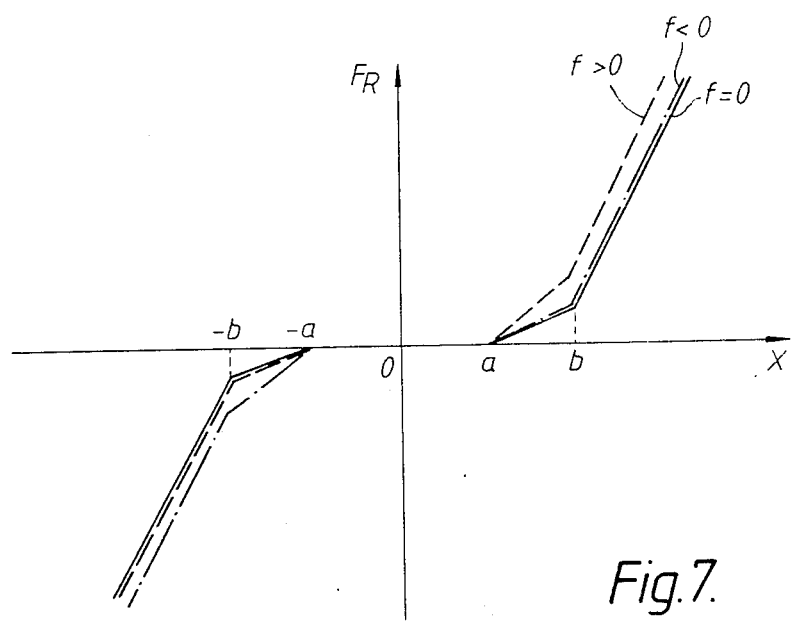
FIG. 7 is another graph showing the characteristics of the calculator shown in FIG. 4.

Also, as shown in expression (1), the region between values of −a and a is a neutral zone and an oscillation of the reaction force $F_R$ may be eliminated. However, the region of the neutral zone may not be necessary. FIG. 7 shows another characteristics of the calculator 153. In the characteristics, when the amount |x| exceeds the value of b, the reaction force $|F_R|$ becomes greater rapidly. Moreover, characteristics corresponding to higher order functions may be available for specified purpose.

Figure 8:
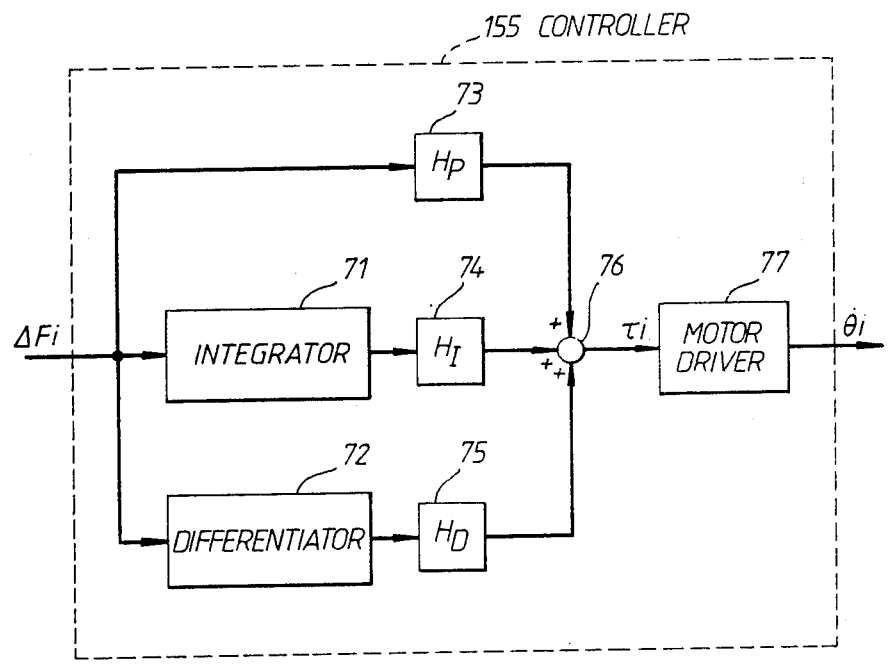
FIG. 8 is a block diagram of an alternative embodiment of the controller shown in FIG. 4.

FIG. 8 is a block diagram of an alternative embodiment of controller 155. This controller is a conventional PID controller which includes an integrator 71, a differentiator, 72 gain multiplier 73, 74 and 75 and an adder 76. The difference ΔFi is supplied to the PID controller to obtain torque τi. A motor driver 77 is driven by the torque τi and drives the driving mechanism 14 of the operation unit 100 at motor speed $\dot{\theta}i$.

In the invention, it is possible to detect the amount X corresponding to a rotational angle of a driving motor in the driving mechanism 14 instead of the sensor 131. It is also possible to detect the operating force applied on the handle 136 by a generated torque from the driving motor instead of the torque/force sensor 135. Moreover, this invention is applicable regardless of the translation/rotation mechanism of the operating unit 100.

According to the invention, the operator may operate or adjust the manipulator more precisely and more subtly than a conventional manipulator controlling.

Numerous modification and variations of the present invention are possible in light of the above the teachings. It is therefore to be understood that, within the scope of the appended claims, the present invention can be practiced in a manner other than a specifically described herein.

What is claimed is:

1. Apparatus for controlling a manipulator, which has an end portion, in response to an external force, comprising:
    control means for generating an operating force/torque corresponding to the external force;
    first detecting means for detecting the operating force/torque generated by the control means;
    second detecting means for detecting a deflecting amount corresponding to the movement of the control means from a reference position;
    third detecting means for detecting an end force applied on the end portion of the manipulator;
    producing means connected to the second and third detecting means for generating reaction signals corresponding to a function of both the deflecting amount and the end force; and
    driving means for generating driving signals corresponding to the difference value between values of output signals from the first detecting means and the producing means, and applying force/torque corresponding to the driving signals on the control means.

2. The apparatus of claim 1, wherein the control means includes three translation axes substantially orthogonal to one another and three rotation axes substantially orthogonal to one another.

3. The apparatus of claim 1, wherein the producing means includes means for preventing an oscillation of the reaction signals.

4. The apparatus of claim 2, wherein the second detecting means includes means for detecting the deflecting amount of the control means from a neutral position.

5. The apparatus of claim 1, wherein the producing means includes means for converting coordinates of data corresponding to the end force.

6. The apparatus of claim 1, wherein the producing means includes means for generating different reaction signals corresponding to a sign of the deflecting amount.

7. The apparatus of claim 6, wherein the producing means includes means for calculating reaction force $F_R$ from the deflecting amount X and the end force f in accordance with the following relationship:

$$F_R = 0 \ (-a < x < a),$$

$$F_R = KaX - a/Ka \ (x \geq a);$$

$$F_R = KbX + a/Kb \ (x \leq -a);$$

where Ka and Kb are expressed by functions of the end force f and a is constant.

8. The apparatus of claim 7, wherein Ka and Kb are related as follows, if $f \geq 0$, $Ka = C|f| + Co$ and $Kb = Co$; and
if $f < 0$, $Ka = Co$ and $Kb = C|f| + Co$;

where C and Co are constants.

9. The apparatus of claim 1, wherein the producing means includes means for generating different reaction signals corresponding to a sign of the end force.

10. The apparatus of claim 1, wherein the producing means includes means for generating the reaction signals corresponding to reaction force/torque which have approximately symmetrical characteristics to a reference position on a predetermined axis.

11. The apparatus of claim 1, wherein the producing means includes means for calculating the reaction signals corresponding to six degrees of freedom.

12. The apparatus of claim 1, wherein the driving means includes multiplying means for multiplying the difference value and a value corresponding to a coefficient of viscosity when the control means is considered to be supported by an elastic mechanism;

a motor driver for driving the manipulator by speed control;

sensing means for detecting rotational velocity of the motor driver;

subtracting means for detecting difference signals between outputs from the multiplying means and the sensing means; and compensating means responsive to output from the subtracting means for generating desired torque, and producing the torque to the motor driver.

13. The apparatus of claim 1, wherein the producing means includes means for generating signals corresponding to an absolute value of reaction force which increase rapidly when an absolute value of the deflecting amount exceeds a predetermined value.

14. The apparatus of claim 1, wherein the driving means includes means for generating desired torque by a PID controller; and a motor driver responsive to the desired torque for driving the control means.

* * * * *